United States Patent [19]

de Mathan

[11] Patent Number: 4,820,542

[45] Date of Patent: Apr. 11, 1989

[54] PROCESS FOR DRYING VEGETABLE MATTER USING HIGH-PRESSURE STEAM

[75] Inventor: Olivier de Mathan, Olivet, France

[73] Assignee: France Luzerne Complexe Agricole du Mont-Bernard, Chalons, France

[21] Appl. No.: 69,147

[22] Filed: Jul. 2, 1987

[30] Foreign Application Priority Data

Jul. 4, 1986 [FR] France .................. 86 09792

[51] Int. Cl.⁴ .............................. A23K 1/00
[52] U.S. Cl. ................. 426/636; 426/443; 426/807; 159/16.3; 203/DIG. 14
[58] Field of Search ............ 426/443, 636, 807; 159/16.3; 203/DIG. 14; 34/216

[56] References Cited

U.S. PATENT DOCUMENTS

| | | | |
|---|---|---|---|
| 3,468,761 | 9/1969 | Stalcud | 203/DIG. 14 |
| 3,684,520 | 8/1972 | Bickoff et al. | 426/636 |
| 3,823,128 | 7/1974 | Bickoff et al. | 426/636 |
| 4,251,925 | 2/1981 | Muhsil et al. | 34/216 |
| 4,349,570 | 9/1982 | Segard et al. | 426/636 |
| 4,653,198 | 3/1987 | Alsaker | 34/216 |
| 4,697,354 | 10/1987 | Gottschalk | 34/216 |

*Primary Examiner*—R. B. Penland
*Attorney, Agent, or Firm*—Jones, Tullar & Cooper

[57] ABSTRACT

Vegetable matter such as lucerne is dried; the latter is heated and then pressed. The liquid is treated in an evaporator employing, as heating fluid, low-pressure steam supplied by an ejector-compressor fed with high-pressure steam supplied, for example, by a nuclear power plant. Low-pressure steam taken from the outlet of the compressor-ejector is also employed to heat the lucerne at. The effluent leaving the evaporator is introduced with the remainder of the high-pressure steam into a drying unit in which air from the environment is preheated. The hot air is employed for drying the moist pressed matter.

6 Claims, 3 Drawing Sheets

PROCESS FOR DRYING VEGETABLE MATTER USING HIGH-PRESSURE STEAM

BACKGROUND OF THE INVENTION

This invention relates to the field of drying (or dehydration) of vegetable matter. Its subject is a drying process of high energy efficiency, which employs high-pressure steam.

Classical processes for the dehydration of fodder employ direct heat exchange between the moist matter and a stream of hot gas in a rotary, for example parallel-flow, drum dryer. Thermal efficiency is proportionately higher the higher the temperature of these gases.

In most cases these hot gases are produced by dilution of combustion gases produced using heating oil, coal, natural gas, biogas or straw, or else air heated in an electric battery. Depending on the temperature, the energy yield varies between 750 and 800 kcal per kg of evaporated water.

Processes based on recovery of the energy of gases produced in a rotary dryer can improve this performance.

Use is then made either of a belt dryer fed with hot air produced in an air condenser placed downstream of the rotary dryer or, when there is a liquid to be concentrated, a multiple-effect vacuum evaporator.

The specific usage can then come down to 450 kcal/kg of evaporated water.

Drying which employs steam, as applied to other materials, is not used for dehydration because of its high energy cost.

At temperatures which are usually accessible with steam, the energy consumption of the dryer as such cannot be reduced below 900 kcal per kilogram of evaporated water. However, this figure must be increased further by 15% to express the usage based on the pimary energy expended in the evaporation boiler, without prejudice to other cost factors in steam production.

SUMMARY OF THE INVENTION

The process according to the invention provides a major improvement in the heat efficiency based on steam. It is particularly well adapted to the case where the steam is a byproduct or a product which is not used at certain periods. Examples of this may be steam of geothermal origin, or that from city heating plants using a boiler for trash incineration, or else from nuclear electricity production during the summer period.

The subject of the invention, in its general form, is a process for drying vegetable matter, in which the vegetable matter to be treated is subjected to a heating operation, followed by a pressing operation, which provides a pressing liquid and a moist pressed matter, both of which are dried, the process being characterized in that high-pressure steam is employed as available fluid, (a) by introducing a first quantity of the said available steam into an evaporation stage intended to dry the pressing liquid, this first quantity of steam being introduced into the evaporation stage after passing through an ejector-compressor, the gaseous effluent originating from the evaporation stage being partially recycled towards the ejector-compressor, (b) by introducing a part of the low-pressure steam leaving the ejector-compressor into the heating stage before pressing of the vegetable matter, and (c) by employing the remainder of the available steam and the remainder of the gaseous effluent from the evaporator in a unit for drying the moist pressed matter.

In this embodiment of the process of the invention it is possible to employ a single-effect (or a single-body) evaporator or concentrator of conventional design and operating under vacuum, in particular.

According to an alternative form of embodiment, the subject of the invention is a process of the abovementioned type, characterized in that high-pressure steam is employed as available fluid, (a) by introducing a first quantity of the said available steam into an evaporation stage intended for drying the pressing liquid, this first quantity of steam being introduced into the evaporation stage after passing through a first ejector-compressor, the gaseous effluent originating from the evaporation stage being partially recycled towards the first ejector-compressor, (b) by introducing a second quantity of the available steam after passing through a second ejector-compressor, into the heating stage before pressing of the vegetable matter, the gaseous effluent originating from the evaporation stage being partially recycled towards the second ejector-compressor, and (c) by employing the remainder of the available steam and the remainder of the gaseous effluent from the evaporator in a unit for drying the moist pressed matter.

In the alternative form of embodiment which has just been referred to, use is made of a double-effect evaporator or concentrator operating under vacuum, in particular.

According to another alternative form of embodiment, the subject of the invention is a process of the above-mentioned type, characterized in that high-pressure steam is employed as available fluid, (a) by introducing a first quantity of the available steam into an evaporation stage intended for drying the pressing liquid, this first quantity of steam being introduced into the evaporation stage after passing through a first ejector-compressor, the gaseous effluent originating from the evaporation stage being partially recycled towards the first ejector-compressor, (b) by introducing a second quantity of the said available steam, after passing through a second ejector-compressor, into the heating stage before pressing of the vegetable matter, the gaseous effluent originating from the evaporation stage being partially recycled towards the second ejector-compressor, and (c) by introducing a third quantity of the available steam with the remainder of the gaseous effluent from the evaporation stage, into a third ejector-compressor, the steam leaving the latter being employed, with the remainder of the available steam, in a unit for drying the moist pressed matter.

In the alternative form of embodiment which has just been referred to, use is made of a triple-effect evaporator or concentrator operating under vacuum, in particular.

The essential feature of the process of the invention consists in carrying out the drying operation using available high-pressure steam, by employing at least one ejector-compressor at an essential point in the system and by combining the basic drying operations in order to permit energy recoveries.

The process of the invention can be applied to a wide variety of vegetable matter. Within the meaning of the present description, the term "vegetable matter" denotes plants or parts of plants, especially their aerial parts, such as foliage and nonlignified stems. The process may be advantageously applied to leafy plants, most especially to fodders such as lucerne.

In the prior art, it has already been proposed to heat certain kinds of fodder, such as lucerne, before they are pressed, by injecting steam directly into the mass of the material. This process has the disadvantage of introducing additional quantities of water into the fodder to be dehydrated, and this increases the energy cost of the drying operation. Nevertheless, it is known that preheating the matter, for example to a temperature of the order of 80° to 85° C., before the pressing operation, has a beneficial effect on the pressing yield and enables a clearer pressing liquid (or liquor) to be obtained. After heating to a temperature in this region, in fact, the protein fraction bonded to chloroplastic pigments is heat-coagulated in the fibrous tissue and the liquor is stripped of a solid matter which could present the risk of fouling the hot walls employed in the drying plant. The softening of the tissues produced by the temperature and the decrease in the viscosity of the liquid greatly facilitate its extraction by pressing.

The invention exploits this known technique of preheating before pressing, but embodies it into a process which, on the one hand, employs available high-pressure steam and, on the other hand, provides a high energy yield, which is very greatly superior to that of the known processes.

Within the meaning of the present invention, "high-pressure steam" or "live steam" is the name given to steam which is available at a pressure of at least $5 \times 10^5$ Pa and which can go up to $18 \times 10^5$ Pa, the preferred range being between $10 \times 10^5$ and $15 \times 10^5$ Pa. As already stated, examples of steam which meet the requirements of the invention are: steam of geothermal origin or that originating from city heating plants using boilers for trash incineration, or that from nuclear electricity production. It is well known, in particular, that, during the summer period, nuclear electric plants supply large quantities of steam which are wasted.

The process combines, so far as energy is concerned, the three operations of
  hot pressing
  drying of the pressing liquid
  drying of the moist pressed matter,
with a view to optimum efficiency.

The invention envisages introducing a part of the available high-pressure steam, passing it through an ejector-compressor beforehand. Apparatus of this type is known to the person skilled in the art. It forms a static nozzle, with venturi action, which allows the temperature of the steam introduced to be lowered. The use of an ejector-compressor of this kind also makes it possible to adjust the steam pressure to the most suitable value for the subsequent operation. By way of example, the appropriate value lies in the region of 12 bars. The use of ejector-compressors is highly advantageous, because equipment of this type is highly reliable and moderate in cost, since it contains no moving parts.

In technology, the term "thermocompressor" is employed synonymously with the term "ejector-compressor". As already stated, this means static apparatus in which the steam under pressure is expanded, the pressure energy being then converted into velocity. In the present description, the term "ejector-compressor" will be employed for preference.

In order to concentrate the pressing liquid, a first quantity of available steam is employed to introduce it into an evaporation stage, after passing through a first ejector-compressor.

In the embodiment of the process which includes a single-body evaporator, it is appropriate to employ a single ejector-compressor situated upstream of the first body.

In the alternative form including a multiple-effect evaporation stage, the number of effects, or of bodies, is chosen as a function of the quantity of steam which is available. Traditional vacuum evaporation equipment, including at least two or three effects, is employed in practice.

According to another characteristic of the invention, part of the gaseous effluent originating from the evaporation stage, advantageously that which originates from the first, or the only, effect of the evaporator, is recycled upstream of the first ejector-compressor, in order to be mixed with the first quantity of available steam.

In the embodiment including a single-effect evaporator, a part of the low-pressure steam leaving the first ejector-compressor is employed for heating the vegetable matter before pressing.

In the embodiment including a multiple-effect evaporator, a second quantity of available steam is introduced after it has passed through a second ejector-compressor, in order to heat the vegetable matter before pressing.

This operation may be performed in an apparatus known as a scalder, that is to say a vessel in which the steam is injected into the mass of vegetable matter. A conventional press, for example a screw-press takes up the preheated matter in order to extract the liquor therefrom and to provide a moist pressed matter. If desired, a screen may be provided to stop any solid particles that the liquor might entrain.

According to another characteristic of the invention, a part of the gaseous effluent originating from the evaporation stage, preferably the effluent originating from the second effect of the evaporator, is recycled towards the second ejector-compressor, so as to be mixed with the second quantity of steam, in order to be employed in heating the vegetable matter which is processed.

According to the invention, the available steam is also employed in the unit for drying the moist pressed matter.

In the embodiment including a single-effect evaporator, the remainder of the steam eaving this evaporator is employed together with the remainder of the available steam to perform the drying of the moist pressed matter.

In the embodiment including a multiple-effect evaporator, a third quantity of available steam is combined with the remainder of the gaseous effluent from the evaporation stage, preferably that leaving the third effect of the evaporator, if the latter includes three-effects, in order to introduce these combined streams into a third ejector-compressor. The steam leaving the latter is then exploited with the remainder of the available steam, for drying the moist pressed matter.

In practice, it is advantageous to employ a dryer with a belt on which the matter to be dried travels, the drying fluid being air. The air is preheated by contact with steam, under the abovementioned conditions, in conventional apparatus of the air heater type. It is sufficient, in principle, to employ a single air heater. However, in order to obtain the best energy efficiency it is preferable to employ several air heaters in series.

According to an advantageous supplementary characteristic, the air in the drying unit is additionally preheated by introducing condensates originating from the evaporation stage into the air heaters. Thus, the condensates originating from the various bodies (or effects) of the concentrator (or evaporator) may be combined into a common stream, in order to preheat the drying air and to improve the efficiency further.

It may also be noted that, in some cases, it may be judicious to divert a part of the condensates in order to employ them in the ejector-compressor(s), in order to produce desuperheating of the gaseous fluids circulating in these units.

BRIEF DESCRIPTION OF THE DRAWINGS

The invention will be illustrated further by the description which follows, given with reference to the attached drawings in which.

DETAILED DESCRIPTION OF THE PREFERRED EMBODIMENTS

Figure 1:
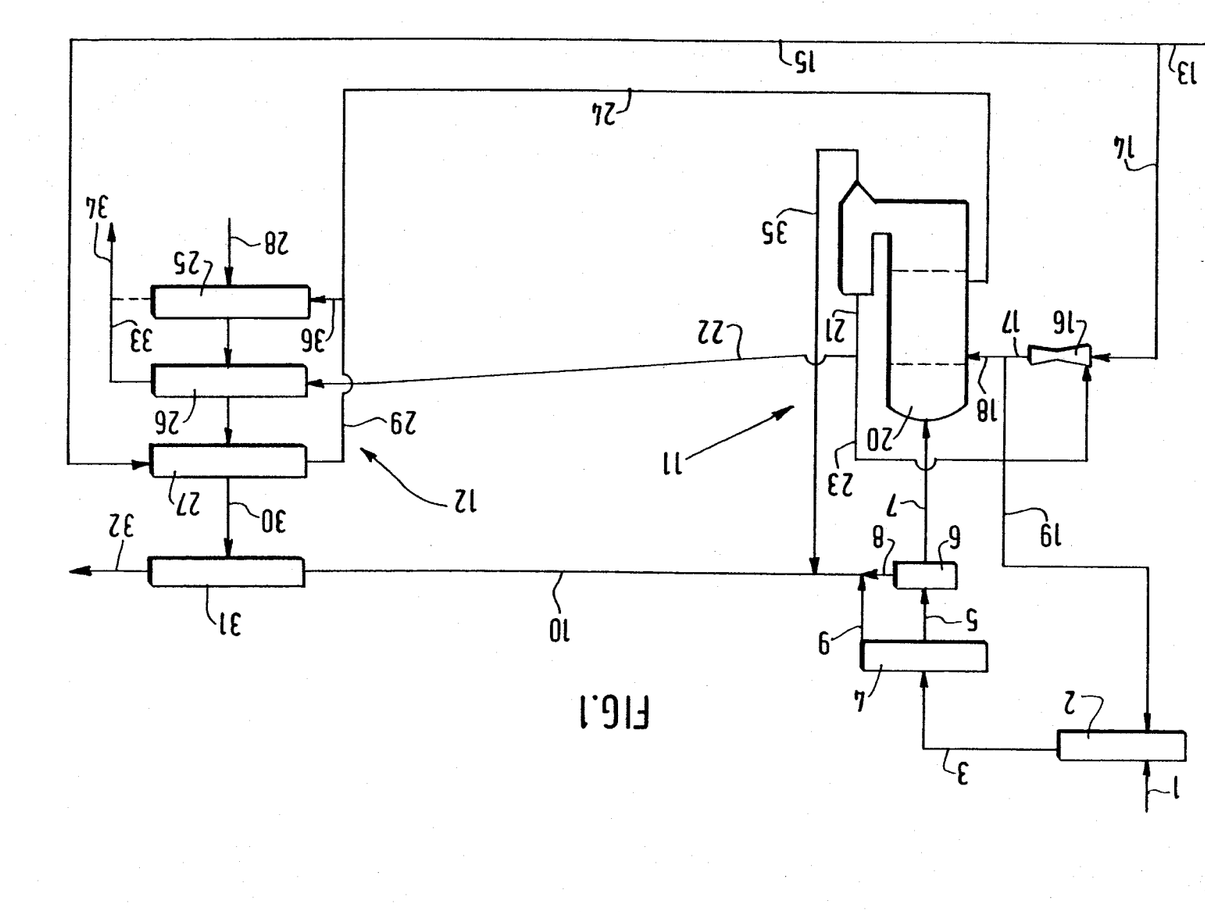
FIG. 1 is a working diagram of the process in which a single-effect evaporator is used.

As can be seen in FIG. 1, the raw vegetable matter to be processed arrives at (1) in a vessel or scalder (2), where it is heated as described later. (3) shows the path along which the heated vegetable matter is fed to the press (4). The latter may advantageously be a screw-press. The pressing operation produces, on the one hand, a liquor (5) and, on the other hand, a moist fibrous matter (9). A screen (6) is inserted in the liquor path (5) to stop any solid particles which may be entrained. The solid matter retained by the screen is added at (8) to the moist fibrous matter (9), to form the mass (10) of pressed vegetable matter, which will subsequently be subjected to drying in a unit indicated generally by reference (12) as described later.

After passing through the screen (6), the clarified liquor is conveyed through the line (7) to an evaporator indicated generally by reference (11). High-pressure steam is provided, furthermore, at (13). The main supply (13) is first divided into two streams (14, 15). Stream (15) is employed in the drying unit (12), as will be described later.

Stream (14) is used in the evaporator (11), entering it via an ejector-compressor (16). It leaves it as steam with reduced temperature and pressre in the form of a stream (17). The latter is divided into two streams (18, 19). Steam stream (19) is used to feed the scalder (2). Steam from stream (18) is employed in the evaporator (11) which, in the example of the embodiment shown in FIG. 1, includes a single body (20). A gas stream (21) consisting essential of low-pressure steam leaves the body (20) of the evaporator (11), and is sub-divided into two streams (22, 23). Stream (22) is introduced into the drying unit (12), as will be described later. Stream (23) is recycled upstream of the ejector-compressor (16) to be mixed with the live steam stream (14). A concentrated liquor, or serum, also leaves the body (20) of the evaporator (11) via the line (35), and may be introduced into the path (10) of the moist fibrous matter, to be dried together with it in the drying unit (12). Lastly, hot condensates, which may also be exploited in the drying unit (12), are recovered in the line (24).

In the illustrative example shown in FIG. 1, the drying unit (12) includes three air heaters (25, 26, 27). Ambient temperature air enters the first air heater (25) at (28). The incoming air is preheated by the hot condensate (24) originating from the evaporator (11), which joins the hot liquid stream (29) originating from the condensates from the air heater (27). The coupled streams (24, 29) are combined in the line (36) to be introduced into the air heater (25). The second air heater (26) is heated by the stream of steam (22) originating from the evaporator (11). The third air heater (27) is fed with the live steam circulating in the line (15). Hot air is thus available in the line (30), and is capable of being introduced into a dryer (31), for example a belt dryer, in which the moist fibrous matter (10) is dried. Dried vegetable matter leaves the process at (32) and may undergo other operations (not shown), for example grinding and granulation. Furthermore, cooled condensates are available at (33), at the outlet of the air heater (26), and are combined with those originating from the air heater (25), to produce a stream (34).

The process just described, shown diagrammatically in the drawing of FIG. 1, has been used for the dehydration of fresh lucerne with a moisture content of 82%. Dry steam at $18 \times 10^5$ Pa, originating from a nuclear electric plant, was available.

A tonnage of 64 tons of lucerne, which was introduced into the process at (1) was treated. The tests have shown that 35 tons of steam at 206° C. at $18 \times 10^5$ Pa had to be used to reduce the moisture content of the lucerne to 15%.

25.35 tons of live steam originating from the stream (14) were needed in the evaporator (11). The remainder of the available steam, that is 9.65 tons, was circulated in the line 15, to feed the drying unit (12).

The ejector-compressor (16) was fed, on the one hand, with the 25.35 tons of live steam circulating in the line (14) and, on the other hand, with 25.35 tons of steam recycled in the line (23), the latter being at a temperature in the region of 90° C. 8 tons of low-pressure steam at a temperature of approximately 104° C. are available in the line (19), at the outlet of the ejector-compressor (16), and are employed in the scalder (2). 42.7 tons of steam at a temperature of approximately 104° C. are available in line (18), which supplies steam to the body (20) of the evaporator (11).

The quantity of steam evaporated in the body (20) is 43.1 tons. Thus, 25.35 tons, already mentioned, in the stream (23) and 17.75 tons in the line (22) are available as steam at approximately 90° C. to feed the air heater (26).

A tonnage of 64 tons of lucerne, introduced into the process at (1), was treated.

49 tons of liquid liquor were obtained in the line (7) at the outlet of the screen (6). The 23 tons of moist fibrous matter are incremented by 5.9 tons of concentrated serum originating from the line (35), giving a total of 28.9 tons of product which is subjected to the drying operation in the unit (12), more particularly in the belt dryer (31).

The evaporator (11) provides another 41 tons of hot condensates, at a temperature in the region of 80° C., which are available in the line (24).

800,000 kg of air at 15° C., preheated in the air heater (25) are introduced via the line (28) into the drying unit (12). This heater receives, in fact, a hot liquid stream in the line (36) in a quantity of 50.6 tons, representing the total of the 41 tons circulating in the line (24) and of 9.60 tons of condensates circulating in the line (29) and originating from the air heater (27). The air leaving the first air heater (25) is at a temperature in the region of 26° C. The air leaving the second air heater (26) is heated to a temperature of the order of 80° C. The air leaving the air heater battery via the line (30) is at a temperature of approximately 110° C. when it enters the dryer (31). In this dryer, 15.35 tons of water are evaporated to produce, at the exit of the process in line (32), 13.55 tons of dried lucerne which may be subsequently converted by grinding and granulation in a conventional manner.

A condensate cooled to 40° C., which is available in the line (34), leaves the first air heater (25).

In the alternative form shown in FIG. 2, the raw vegetable matter to be treated arrives at (101) in a vessel or scalder (102), where it is heated as described later. (103) denotes the path for feeding the heated vegetable matter to the press (104). The latter may advantageously be a screw-press. The pressing operation produces, on the one hand, a liquor (105) and, on the other hand, a moist fibrous matter (109). A screen (106) is inserted in the path of the liquor (105) to stop any solid particles which may be entrained. The solid matter retained by the screen is added at (108) to the moist fibrous matter (109) to form the mass (110) of pressed vegetable matter which will subsequently undergo a drying operation in a unit denoted generally by the reference (112) as described later.

After passing through the screen (106) the clarified liquor is conveyed by the line (107) to a multiple-effect evaporator, indicated generally by the reference (111). Furthermore, high-pressure steam is available at (113). The main feed (113) is first separated into two streams (114, 115). The stream (115) is employed in the drying unit (112), as will be described later. The stream (114) is itself divided into two streams (116, 122), the stream (116) being used in the evaporator (111), while the stream (122) is used to feed the scalder (102), as will be explained later.

The high-pressure steam from the stream (116) is introduced into a first ejector-compressor (117). This produces steam at lower temperature and lower pressure in the stream (118) which enters the body (119) or first effect of the evaporator (111). The design of the multiple-effect evaporator (111) is conventional. The evaporation takes place under vacuum. A gaseous effluent (123) consisting essentially of steam and a hot condensate stream (124) leave the first evaporator body (119), while the concentrated pressing liquid leaves via the line (125) to enter the second body (120). The leaving steam (123) is subdivided into two streams (126, 127). The stream (126) is recycled upstream of the ejector-compressor (117) to be mixed with the steam stream (116). The stream (127) is used for heating the second evaporator body (120). The latter produces, on the one hand, a gaseous effluent (130) and, on the other hand, a concentrated liquor (131), which may be introduced into the path (110) of the moist fibrous matter, to be dried together with the latter in the drying unit (112). The gaseous effluent which consists essentially of steam is subdivided into two streams (132, 133). The stream (132) is employed in the drying unit (112), as will be described later. The stream (133) is conveyed upstream of a second ejector-compressor (134) to be mixed with the high-pressure steam stream delivered at (122). Steam at reduced temperature and reduced pressure leaves the ejector-compressor (134) at (135) and is introduced into the scalder (102) in order to heat the vegetable matter (101).

Furthermore, the evaporator (111) produces, in the first body (119), hot condensates in the line (124), while the second body (120) produces hot condensates which circulate in the line (128) and which, when combined with the above, produce the stream (129) which is exploited in the drying unit (112). The drawing also shows that, in view of the double-effect concentration which forms the subject of the embodiment of FIG. 2, the liquor (125) concentrated in the first body (119) is conveyed into the second body (120).

Figure 2:
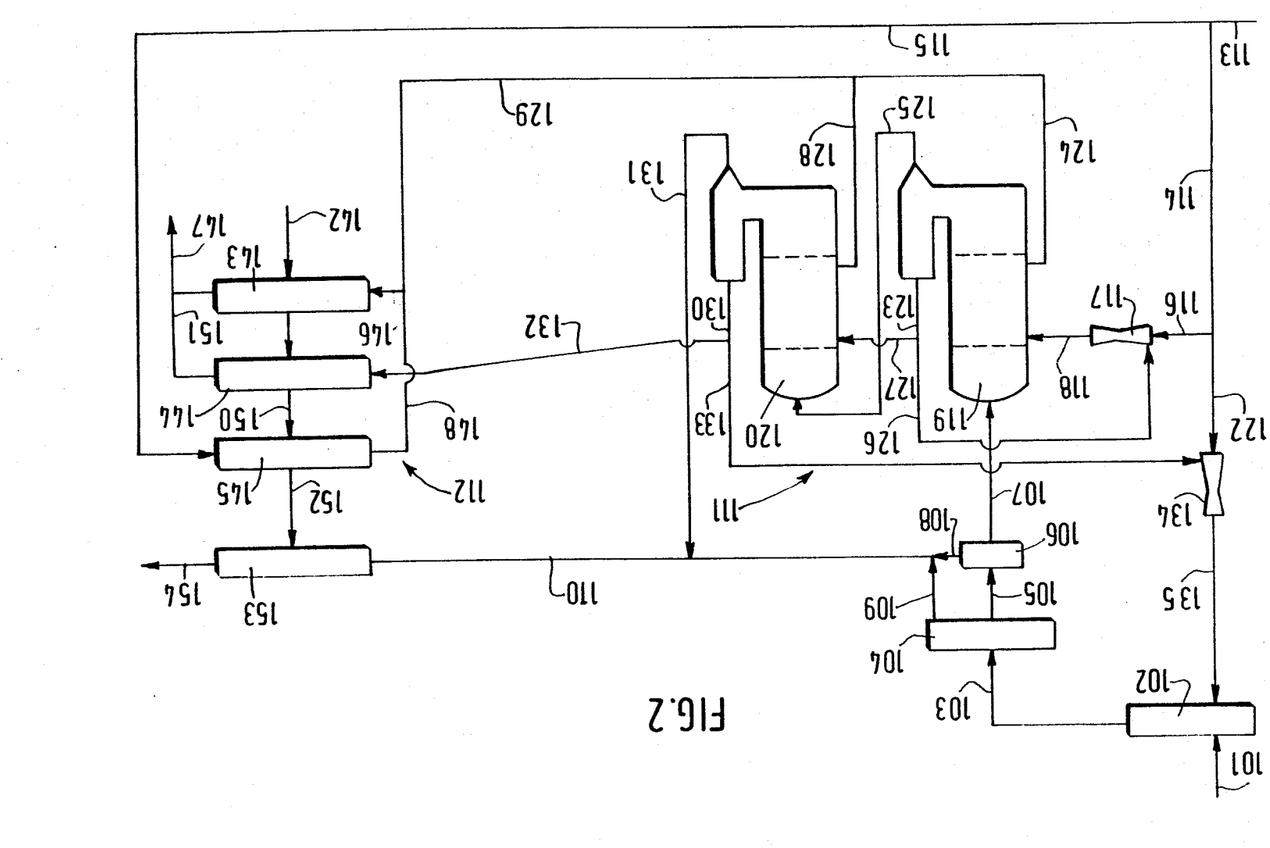
FIG. 2 is a working diagram of an alternative form of the process, in which a double-effect evaporator is employed.

The drying unit shown in FIG. 2 and indicated generally by the reference (112), consists of three air heaters (143, 144, 145). Air at ambient temperature enters the first air heater (143) at (142). The incoming air is preheated by the hot condensates entering the air heater (143) at (146). This stream (146) is formed by combining the abovementioned stream (129) and the stream (148) originating from the air heater (145). The air heater (144) is fed with steam in the line (132), partly originating from the effluent from the second evaporator body (120). Cooled condensates are available at (151) at the outlet of the air heater (144), and are combined with those originating from the air heater (143) to produce a stream (147).

The air heater (145) is fed with the remainder of the available high-pressure steam which circulates in the line (115). Hot air is thus available at (152), which is capable of being introduced into a dryer (153), for example a belt dryer, in which the moist fibrous matter (110) is dried.

The dried vegetable matter leaves the process at (154) and may undergo other operations which are not shown, for example grinding and granulation.

The process described with reference to FIG. 2 has been used for the dehydration of fresh lucerne with a humidity content of 82%. Dry steam at $18 \times 10^5$ Pa, originating from a nuclear electric plant was available.

A tonnage of 51.5 tons of lucerne, which entered the process at (101) was treated. The tests have shown that 28.7 tons of steam at 206° C. at $18 \times 10^5$ Pa had to be employed to reduce the moisture content of the lucerne to 15%.

11.5 tons of live steam originating from the stream (116) were needed in the evaporator or concentrator (111). The quantity of steam circulating in the stream (122) was 3.86 tons. This stream was introduced upstream of the ejector-compressor (134) at the same time as 2.58 tons of low-pressure steam at approximately 80° C. circulating in the line (133) and originating from the second evaporator body (120). A quantity of low-pressure steam of 6.44 tons at a temperature of approximately 102° C. was thus available at the outlet of the ejector-compressor (134), and could be conveyed via the line (135) towards the scalder (102). 39.45 tons of liquid liquor were obtained in the line (107) at the outlet of the screen (106). 18.49 tons of moist fibrous matter were produced, which are incremented by 4.75 tons of concentrated serum originating from the line (131), which gives a total of 23.24 tons of product subjected to a drying operation in the unit (112), more particularly in the belt dryer (153).

The heat requirements of the evaporator (111) are satisfied by the 23 tons of steam at 104° C. circulating in the line (118) and originating from the ejector-compressor (117). The latter receives, as described earlier, 11.5 tons of live steam via the line (116) and a supplement of 11.5 tons of low-pressure steam at 90° C., recycled in the line (126) and originating from the first evaporator body (119).

A quantity of 23.2 tons of water is evaporated in the first evaporator body (119). The effluent leaves via the line (123) and provides, on the one hand, the 11.5 tons in the line (126), which are recycled to the ejector-compressor (117) and, on the other hand, the 11.7 tons of steam in the line (127) which are used to feed the second evaporator body (120).

A quantity of 11.5 tons of water is evaporated in the second evaporator body (120). The effluent leaves via the line (130) to produce 8.3 tons in the stream (132) for feeding the drying unit (112) and 2.58 tons in the line (111) for introduction into the second ejector-compressor (134).

The evaporator (111) supplies another 33 tons of hot condensates at a temperature in the region of 80° C., which are available in the line (129).

640,000 kg of air at 15° C., preheated in the air heater (143) by 55.8 tons of condensates entering via the line (146) are introduced via the line (142) into the drying unit (112). A condensate cooled to 40° C. leaves the first air heater (143) and is available in the line (147). Air preheated in the air heater (143) to a temperature in the region of 27° C. enters the air heater (144). The latter receives 8.3 tons of low-pressure steam circulating in the line (132) as heating fluid. The air which enters the air heater (144) at a temperature in the region of 27° C. leaves it at a temperature in the order of 50° C., to enter the third air heater (145). The latter receives 13.33 tons of live steam available in line (115). The hot air leaves at 110° C. in the line (152) to enter the belt dryer (153) in which 12.33 tons of water are evaporated.

10.91 tons of dried lucerne, which may subsequently be converted by grinding and granulation in a conventional manner, are obtained at the exit of the process in the line (154).

Figure 3:
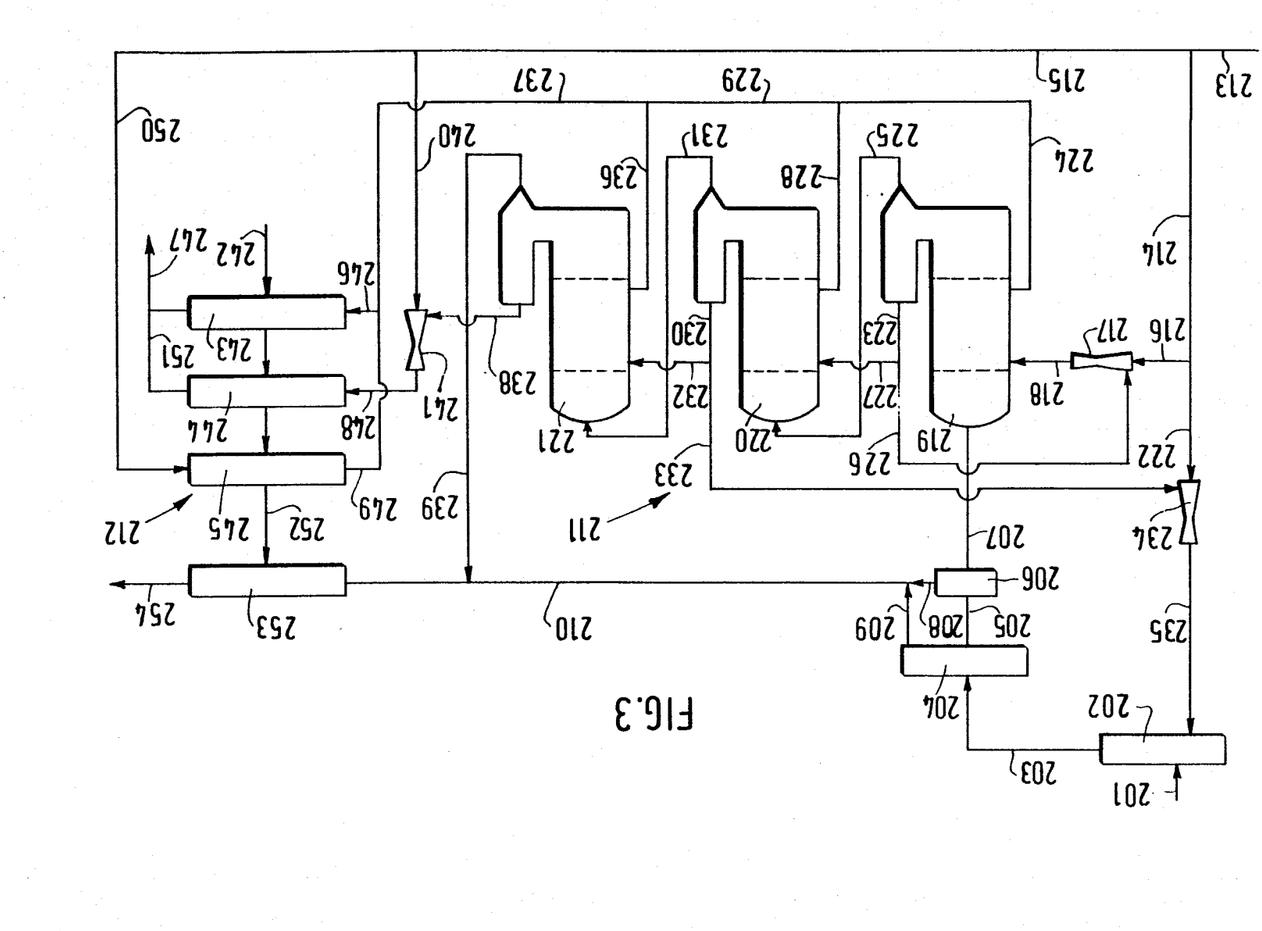
FIG. 3 is a working diagram of an alternative form of the process, in which a triple-effect evaporator is employed.

FIG. 3 shows the operating diagram of the process in which a triple-effect evaporator is employed. The raw vegetable matter to be treated arrives at (201) in the scalder (202), where it is heated as described later. (203) shows the path of the heated vegetable matter supplied to the press (204), for example a screw-press. The pressing operation produces, on the one hand, a liquor (205) and, on the other hand, a moist fibrous matter (209). A screen (206) is inserted in the path of the liquor (205) to stop any solid particles which may be entrained. The solid matter retained by the screen (206) is added at (208) to the moist fibrous matter (209) to form the mass (210) of pressed vegetable matter which will subsequently undergo a drying operation in a unit (212) as described later.

After passing through the screen (206), the clarified liquor is conveyed by the line (207) to the evaporator (211) which, in this case, is a three-effect evaporator. Futhermore, high-pressure steam is available at (213). The main delivery (213) is first divided into two streams (214, 215). The stream (215) is employed in the drying unit (212), as will be described later.

The stream (214) is itself divided into two streams (216, 222), the stream (216) being used in the evaporator (211), while the stream (222) is used to feed the scalder (202), as will be explained later.

The high-pressure steam from the stream (216) enters a first ejector-compressor (217). This produces steam at reduced temperature and reduced pressure in the stream (218), which enters the body (219) or first effect of the evaporator (211). The design of the multiple-effect evaporator (211) is conventional. The evaporation takes place under vacuum. A gaseous effluent (223) consisting essentially of steam and a hot condensate stream (224) leave the first evaporator body (219), while the pressing liquid leaves via the line (225) to enter the second body (220). The steam leaving at (223) is subdivided into two streams (226, 227). The stream (226) is recycled upstream of the ejector-compressor (217) to be mixed with the steam stream (216). The stream (227) is used to heat the second evaporator body (220). The hot condensates in the line (224) join the condensate stream (228) leaving the second evaporator body (220). The latter produces, on the one hand, a gaseous effluent (230) and, on the other hand, a concentrated liquor (231) which enters the third evaporator body (221). The gaseous effluent, which consists essentially of steam, is subdivided into two streams (232, 233). The stream (232) is employed for heating the third evaporator body (221). The stream (233) is conveyed upstream of a second ejector-compressor (234) to be mixed with the stream of high-pressure steam delivered at (222).

Steam at reduced temperature and reduced pressure leaves the ejector-compressor (234) at (235) and is introduced into the scalder (202), in order to heat the vegetable matter (201).

The third evaporator body (221) also produces condensates (236) which are added into the line (229). These combined condensates circulate in the line (237) to be employed for heating air in the drying unit (212), as will be described later. Leaving the third evaporator body (221) are, on the one hand, a gaseous effluent (steam), via line (238), and, on the other hand, a concentrated liquor or serum which may be introduced via the line (239), into the path (210) of the moist fibrous matter, in order to be dried together with the latter in the drying unit (212).

In the illustrative example shown in the drawing, this drying unit (212) includes three air heaters (243, 244, 245). Air at ambient temperature enters the first air heater (243) at (242). The incoming air is preheated by the hot condensates entering the air heater (243) at (246). These condensates are obtained by combining the condensates originating at (237) from the evaporator (211) and the condensates leaving the air heater (245) at (249). The second air heater (244) is heated by low-pressure steam (248) originating from a third ejector-compressor (241). The latter is fed, on the one hand, with the steam (238) originating from the third evaporator body (221) and, on the other hand, with a stream (240) of high-pressure steam available from line (215). Cooled condensates are available at (251) at the outlet of the air heater (244) and join those originating from the air heater (243) to produce a stream (247).

The air heater (245) is fed with the remainder of the available high-pressure steam which circulates in the line (250). Hot air is thus available at (252), which can be introduced into a dryer (253), for example a belt dryer, in which the moist fibrous matter (210) is dried.

The dried vegetable matter leaves the process at (254) and may undergo other operations (not shown), for example grinding and granulation.

The process described with reference to FIG. 3 has been used for the dehydration of fresh lucerne with a moisture concent of 82%. Dry steam at $18 \times 10^5$ Pa, originating from a nuclear electric power plant, was available.

A tonnage of 64 tons of lucerne, which entered the process at (201), was processed. The tests have shown that 35 tons of steam at 26° C. at $18 \times 10^5$ Pa needed to be used to reduce the moisture content of the lucerne to 15%.

11.5 tons of live steam originating from the stream (216) were needed in the evaporator or concentrator (211). The quantity of steam circulating in the stream (222) was 4.8 tons. This stream entered upstream of the ejector-compressor (234) at the same time as 3.2 tons of low-pressure steam at 80° C. circulating in the line (233) and originating from the second evaporator body (220). Thus, a quantity of 8 tons of low-pressure steam at a temperatue of 102° C. was available at the outlet of the ejector-compressor (234) and could be conveyed by the line (235) towards the scalder (202).

49 tons of liquid liquor were obtained in the line (207) at the outlet of the screen (206). The 23 tons of moist fibrous matter are incremented by 5.9 tons of concentrated serum originating from the line (239), giving a total of 28.9 tons of product subjected to the drying operation in the unit (212), more particularly in the conveyor belt dryer (253).

The heat requirements of the evaporator or concentrator (211) are met by the 23 tons of steam at 104° C. circulating in the line (218) and originating from the ejectorcompressor (217). The latter, as already seen, receives 11.5 tons of live steam via the line (216) and an additional quantity of 11.5 tons of low-pressure steam at 90° C. recycled in the line (226) originating from the first evaporator body (219).

A quantity of 23.2 tons of water is evaporated in the first evaporator body (219). The effluent leaves via the line (223) and provides, on the one hand, the 11.5 tons in the line (226) which are recycled to the ejectorcompressor (217) and, on the other hand, the 11.7 tons of steam in the line (227) used to feed the second evaporator body (220).

A quantity of 11.5 tons of water is evaporated in the second evaporator body (220). The effluent leaves via the line (230) and is subdivided into 3.2 tons at 80° C. in the line (233), which are used in the ejector-compressor (234) and 8.3 tons in the line (232), which are used to feed the third evaporator bpdy (221).

A total quantity of 8.4 tons of water is evaporated in the third evaporator body (221) and is thus available for use in the line (238) for feeding the ejector-compressor (231). The steam in the line (238) is low-pressure steam which is at a temperature in the region of 64.5° C. The ejector-compressor (241) receives, via the line (240), 3.9 tons of live steam, which enables 12.3 tons of steam at 75° C. to be obtained at the outlet of the said ejector (241), in the line (248).

The evaporator or concentrator (211) also provides 41 tons of hot condensates at a temperature in th region of 80° C., which are available in the line (237).

800,000 kg of air at 15°, which are preheated in the air heater (243) by the condensates in the line (237) and the condensates in the line (249), which are combined in the line (246), enter the drying unit (212) via the line (242). A condensate cooled to 40° C. leaves the first air heater (243) and is available in the line (247). Air preheated in the air heater (243) to a temperature of about 27° C. enters the air heater (244). The latter receives the low-pressure steam from the line (248) as heating fluid. The air is thus heated to a temperature in the region of 64° C. and passes into the air heater (245). The latter receives 14.8 tons of live steam available in the line (250). The hot air leaves at 110° C. in the line (252) to enter the belt dryer (253), in which 15.35 tons of water are evaporated.

13.55 tons of drled lucerne are obtained at the exit of the process, in the line (254), and may be subsequently converted, in a conventional manner, by grinding and granulation.

The total usage in the drying unit (212) is 1,100 kcal per kg of water for 15.35 tons of evaporation per hour.

Thus, despite the introduction of 8 tons of steam into the lucerne in the scalder (202), the total usage of high-pressure steam is only 35 tons. The dried lucerne with a moisture content of 11% leaves at (254).

The overall specific usage is thus 460 kcal per kg of water. This usage is approximately one half of that which would result from integral drying of the same mass on a belt with air heated with the same steam.

Lastly, it should be noted that the plant for implementing the process of the invention represents a smaller investment than that of a low-temperature belt dryer of equivalent capacity.

The process shown in the attached drawings corresponds to the optimum energy efficiency. Needless to say, a number of alternative forms may be introduced into this process without departing thereby from the scope of the invention. Thus, it is not at all essential to employ a three-stage drying unit. A fluid circulation such as illustrated provides the best heat efficiency. However, for certain practical requirements it may be unnecessary to make use of the heat available in the hot condensates leaving the various evaporator bodies.

Also, the drawings do not show certain arrangements which consist in injecting small quantities of condensates into the ejector-compressor(s).

I claim:

1. A process for drying vegetable matter utilizing a separating site, a treatment site, a drying site, at least one ejector-compressor connected to the separating site and the treatment site and a source of high pressure and high temperature steam, comprising the steps of:

directing a first quantity of steam from the high pressure and high temperature steam source to the input of at least one ejector-compressor and passing said first quantity of steam through said at least one ejector-compressor to reduce its pressure and temperature;

heating the vegetable matter at the separating site with a part of the reduced pressure and temperature steam;

pressing the heated vegetable matter at the separating site to produce thereby a liquor and moist pressed fibrous vegetable matter;

passing the liquor to the treatment site and the moist pressed fibrous vegetable matter to the drying site;

subjecting the liquor at the treatment site to the remainder of the reduced pressure and temperature steam to dry the liquor and produce thereby a gaseous effluent;

passing a part of the gaseous effluent to the input side of the ejector-compressor;

passing the remainder of the gaseous effluent to the drying site; and drying the pressed fibrous vegetable matter at the drying site utilizing the remainder of the gaseous effluent.

2. The process as defined in claim 1, further comprising the step of:

passing a second quantity of steam from the high pressure and high temperature steam source to the drying site to aid in drying the pressed fibrous vegetable matter at the drying site.

3. A process for drying vegetable matter utilizing a separating site, a treatment site having a first evaporator body and a second evaporator body connected to each other, a drying site, a first ejector-compressor connected to the treatment site, a second ejector-compressor connected to the separating site and the treatment site, and a source of high pressure and high temperature steam, comprising the steps of:

directing a first quantity of steam from the high pressure and high temperature steam source to the input of both ejector-compressors, passing a part of said first quantity of steam through said first ejector-compressor and the remainder of said first quantity of steam through said second ejector-compressor to reduce its pressure and temperature;

heating the vegetable matter at the separating site with the reduced pressure and temperature steam from the second ejector-compressor;

pressing the heated vegetable matter and the separating site to produce thereby a liquor and moist pressure fibrous vegetable matter;

passing the liquor to the treatment site and the moist pressed fibrous vegetable matter to the drying site;

subjecting the liquor at the treatment site to the reduced pressure and temperature steam from the first ejector-compressor to dry the liquor and produce thereby a gaseous effluent from each evaporator body;

passing a part of the gaseous effluent from the first evaporator body to the input side of the first ejector-compressor;

passing the remainder of the gaseous effluent from the first evaporator body to the second evaporator body;

passing a part of the gaseous effluent from the second evaporator body to the input side of the second ejector-compressor;

passing the remainder of the gaseous effluent from the second evaporator body to the drying site; and drying the pressed fibrous vegetable matter at the drying site utilizing the remainder of the gaseous effluent from the second evaporator body.

4. The process as defined in claim 3, further comprising the step of:

passing a second quantity of steam from the high pressure and high temperature steam source to the drying site to aid in drying the pressed fibrous vegetable matter at the drying site.

5. A process for drying vegetable matter utilizing a separating site, a treatment site having a first evaporator body, a second evaporator body and a third evaporator body connected to each other, a drying site, a first ejector-compressor connected to the treatment site, a second ejector-compressor connected to the separating site and the treatment site, a third ejector-compressor connected to the treatment site and the drying site, and a source of high pressure and high temperature steam, comprising the steps of:

directing a first quantity of steam from the high pressure and high temperature steam source to the input of the three ejector-compressors, passing a first part of said first quantity of steam through said first ejector-compressor, a second part of said first quantity of steam through said second ejector-compressor and a third part of said first quantity of steam through said third ejector-compressor to reduce its pressure and temperature;

heating the vegetable matter at the separating site with the reduced pressure and temperature steam from the second ejector-compressor;

pressing the heated vegetable matter at the separating site to produce thereby a liquor and moist pressed fibrous vegetable matter;

passing the liquor to the treatment site and the moist pressed fibrous vegetable matter to the drying site;

subjecting the liquor at the treatment site to the reduced pressure and temperature steam from the first ejector-compressor to dry the liquor and produce thereby a gaseous effluent from each evaporator body;

passing a part of the gaseous effluent from the first evaporator body to the input site of the first ejector-compressor;

passing the remainder of the gaseous effluent from the first evaporator body to the second evaporator body;

passing a part of the gaseous effluent from the second evaporator body to the input side of the second ejector-compressor;

passing the remainder of the gaseous effluent from the second evaporator body to the third evaporator body;

passing the gaseous effluent from the third evaporator body to the input side of the third ejector-compressor; and drying the pressed fibrous vegetable matter at the drying side utilizing the reduced pressure and temperature steam from the third ejector-compressor.

6. The process as defined in claim 5, further comprising the step of:

passing a second quantity of steam from the high pressure and high temperature steam source to the drying site to aid in drying the pressed fibrous vegetable matter at the drying site.

* * * * *